Patented Aug. 22, 1933

1,923,227

UNITED STATES PATENT OFFICE 1,923,227

DYESTUFFS OF THE ANTHRAQUINONE SERIES

Paul Nawiasky and Otto Chrzescinski, Ludwigshafen-on-the-Rhine, Germany, assignors to General Aniline Works, Inc., New York, N. Y., a Corporation of Delaware No Drawing. Application June 7, 1930, Serial No. 459,827, and in Germany June 14, 1929

5 Claims. (Cl. 260—46)

The present invention relates to the production of vat dyestuffs from condensation products of aminoanthraquinones and halogenbenzanthraquinones.

We have found that new vat dyestuffs are obtained by treating with acid condensing agents the products obtainable by the action of aminoanthraquinones on 5.8-dihalogen-1.2-benzanthraquinones. The initial material may be obtained by condensing 5.8-dihalogen-1.2-benzanthraquinones with aminoanthraquinones in nitrobenzene in the presence of copper or copper compounds and acid-binding agents, such as for example sodium carbonate and sodium acetate.

The new dyestuffs correspond probably to the general formula:

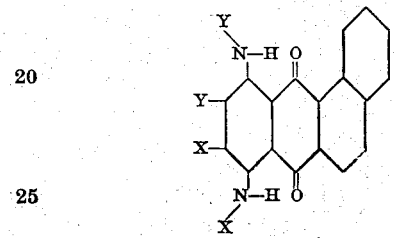

in which X,X and Y,Y stand for vicinal carbon atoms of anthraquinone radicles which may be substituted. The new dyestuffs generally speaking possess excellent fastness properties and show an important technical deepening or displacement of shade in contrast to the products obtainable by the action of the corresponding aminoanthraquinones on 1.4-dihalogenanthraquinones and subsequent action of acid condensing agents.

The following examples will further illustrate the nature of this invention, but the invention is not restricted to these examples. The parts are by weight.

Example 1

4 parts of the product obtainable by boiling 5.8-dichloro-1.2-benzanthraquinone and 1-aminoanthraquinone in nitrobenzene in the presence of copper acetate, copper powder and sodium acetate, are introduced at 100° centigrade into a solution of 8 parts of aluminium chloride in 16 parts of pyridine prepared while cooling. The whole is then stirred at from 125° to 130° centigrade until the reaction is completed, when it is diluted with water and worked up in the usual manner, the crude dyestuff obtained being preferably purified by vatting and reprecipitation.

The new dyestuff probably corresponding to the formula:

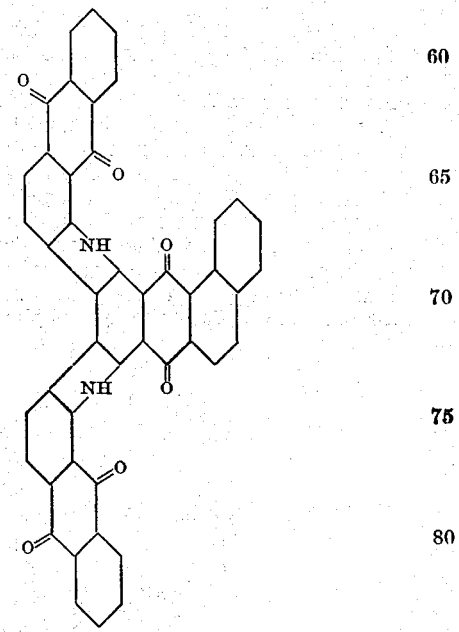

is a dark brown powder which dissolves in sulphuric acid monohydrate giving a brown violet coloration and which dyes cotton from a warm red brown hydrosulphite vat powerful brown shades fast to chlorine and soaping and having excellent fastness properties.

Example 2

4 parts of the product obtainable by heating 6.8 parts of 1-amino-5-benzoylaminoanthraquinone with 3.5 parts of 5.8-dichloro-1.2-benzanthraquinone in nitrobenzene in the presence of sodium acetate and copper compounds, are treated with a solution of aluminium chloride in pyridine as described in Example 1 and are worked up in the same manner. A dyestuff probably corresponding to the formula:

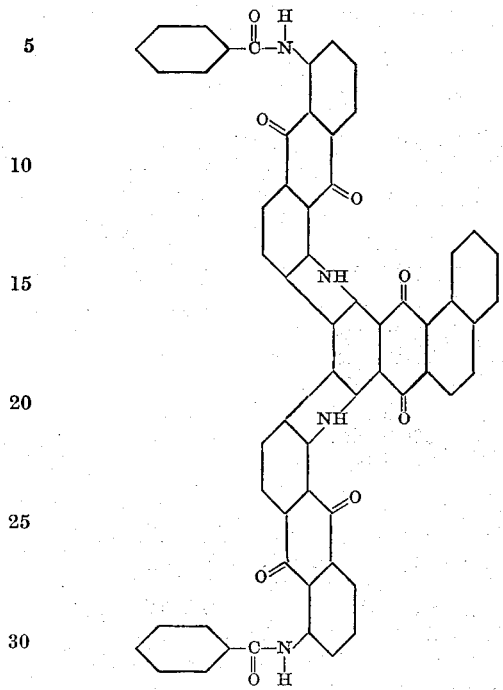

is obtained in excellent yields which dissolves in sulphuric acid giving a blue coloration and which dyes cotton from a warm red brown hydrosulphite vat in beautiful pure brown shades.

By subjecting the reaction product from 1-amino-4-benzoylaminoanthraquinone and 5.8-dichloro-1.2-benzanthraquinone to the same reaction a dyestuff is obtained which dissolves in concentrated sulphuric acid giving a dark green coloration and which dyes cotton from a warm red brown hydrosulphite vat powerful brown shades of good covering power and excellent fastness properties. It probably has the formula:

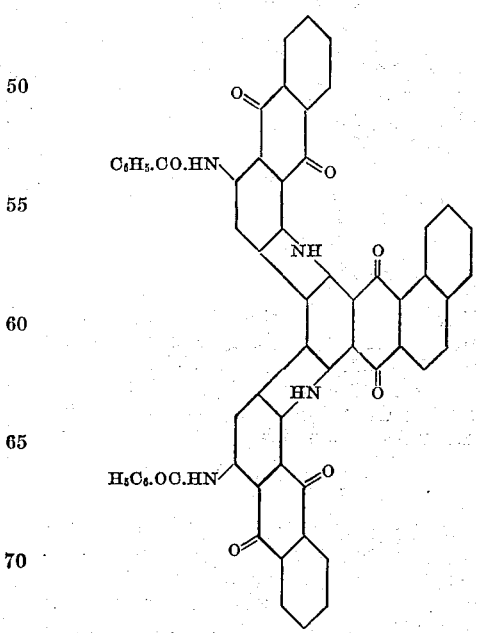

What we claim is:—

1. A process for the production of a new vat dyestuff, which comprises heating a product corresponding to the formula:

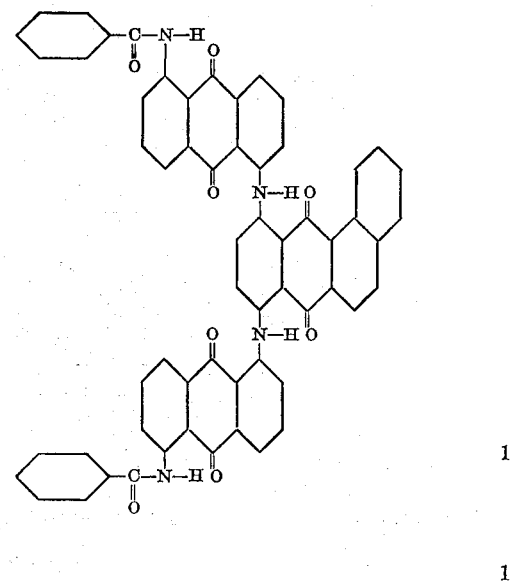

with a solution of aluminium chloride in pyridine.

2. The vat dyestuff probably corresponding to the formula:

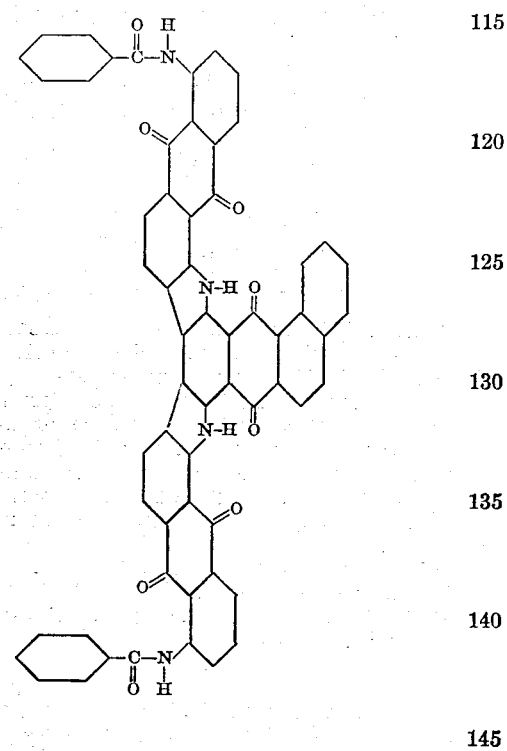

the dyestuff dissolving in concentrated sulphuric acid giving a blue solution and dyeing cotton from a red brown vat pure brown shades.

3. The vat dyestuff probably corresponding to the formula:

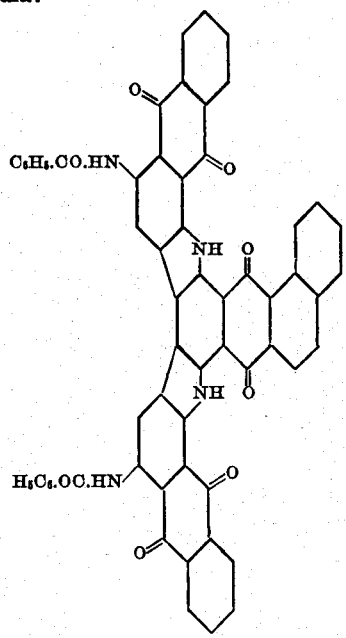

the dyestuff dissolving in concentrated sulphuric acid giving a dark green solution and dyeing cotton from a red brown vat brown shades.

4. A process for the production of vat dyestuffs, which comprises heating with an acid condensing agent a product corresponding to the general formula:

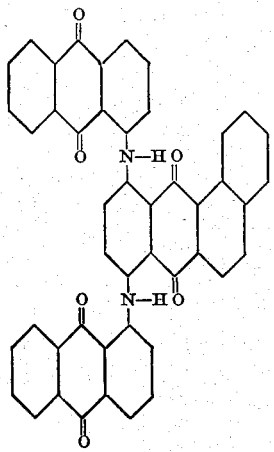

in which the anthraquinone radicles may be substituted in the alpha-positions by benzoylamino radicles.

5. Vat dyestuffs probably corresponding to the formula:

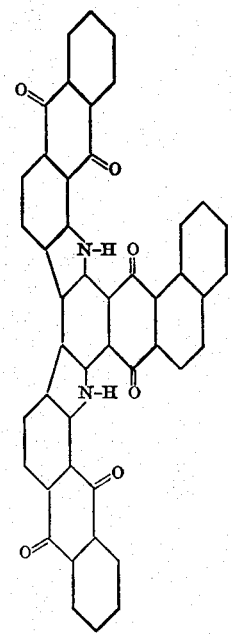

in which the anthraquinone radicles may be substituted in the alpha-positions by benzoylamino radicles, the dyestuffs being soluble in concentrated sulphuric acid and dyeing cotton brown shades from red brown vats.

PAUL NAWIASKY.
OTTO CHRZESCINSKI.